United States Patent Office 3,459,747
Patented Aug. 5, 1969

3,459,747
SUBSTITUTED 7-ACETYLAMINO
CEPHALOSPORANIC ACIDS
Benjamin Arthur Lewis, Suffern, and Martin Leon
Sassiver, Pearl River, N.Y., and Robert Gordon
Shepherd, Ridgewood, N.J., assignors to American
Cyanamid Company, Stamford, Conn., a corporation of Maine
No Drawing. Filed Feb. 15, 1967, Ser. No. 616,168
Int. Cl. C07d 99/10, 93/06
U.S. Cl. 260—243
10 Claims

ABSTRACT OF THE DISCLOSURE

This disclosure describes compounds of the class of 7-[5-(carboxymethyl)thiophene-2-acetylamino]cephalosporanic acids, 7-[5-(carboxymethyl)furan-2-acetylamino]cephalosporanic acids, 7-[5-(carboxamidomethyl)thiophene-2-acetylamino]cephalosporanic acids, 7-[5-(carboxamidomethyl)furan-2-acetylamino]cephalosporanic acids, 7-[4-(carboxymethyl)thiophene-3-acetylamino]cephalosporanic acids, 7-[4-(carboxymethyl)furan-3-acetylamino]cephalosporanic acids, 7-[4-(carboxamidomethyl)thiophene-3-acetylamino]cephalosporanic acids, and 7-[4-(carboxamidomethyl)furan-3-acetylamino]cephalosporanic acids; useful as anti-bacterial agents.

Brief summary of the invention

This invention relates to new derivatives of 7-aminocephalosporanic acid and, more particularly, is concerned with novel compounds which may be represented by the following general formulae:

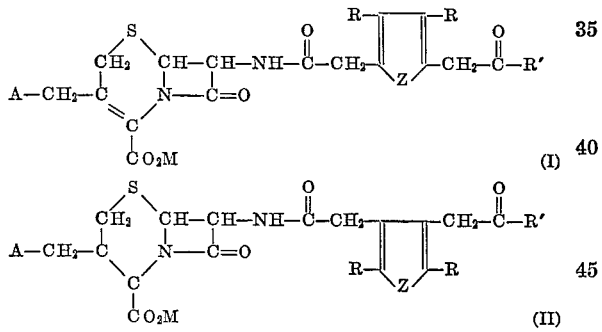

wherein R is hydrogen or lower alkyl, Z is oxygen or sulfur, R' is hydroxy or amino, A is acetoxy or N-pyridinium, and M is hydrogen, pharmaceutically acceptable non-toxic cations or an anionic charge when A is N-pyridinium. Suitable lower alkyl groups are those having from 1 to 4 carbon atoms such as methyl, ethyl, isopropyl, n-butyl, etc.

Detailed description of the invention

In the general Formulae I and II set forth above, in those instances where A is N-pyridinium, the cationic charge on this group is matched by the anionic charge of the carboxylic acid radical, the entire molecule being of a zwitterion nature and M is thus an anionic charge. Typical compounds represented by the above general Formulae I and II are, for example, 7-[5-(carboxymethyl)thiophene-2-acetylamino]
 cephalosporanic acid,
7-[5-(carboxymethyl)thiophene-2-acetylamino]-3-
 (1-pyrridylmethyl)-3-cephem-4-carboxylic acid betaine,
7-[5-(carboxymethyl)-furan-2-acetylamino]
 cephalosporanic acid,
7-[4-(carboxymethyl)-furan-3-acetylamino]
 cephalosporanic acid,
7-[2,5-dimethyl-4-(carboxymethyl)thiophene-3-
 acetylamino]cephalosporanic acid,
7-[2,5-dimethyl-4-(carboxymethyl)furan-3-acetylamino]
 cephalosporanic acid,
7-[5-(carboxamidomethyl)thiophene-2-acetylamino]
 cephalosporanic acid,
7-[5-(carboxamidomethyl)thiophene-2-acetylamino]-3-
 (1-pyridylmethyl)-3-cephem-4-carboxylic acid betaine,
7-[5-(carboxamidomethyl)furan-2-acetylamino]
 cephalosporanic acid,
7-[3,4-dimethyl-5-(carboxymethyl)thiophene-2-
 acetylamino]cephalosporanic acid,
7-[3,4-diethyl-5-(carboxamidomethyl)-furan-2-
 acetylamino]cephalosporanic acid, and the like.

Also embraced within the scope of the present invention are the non-toxic, pharmaceutically acceptable salts of these derivatives of 7-aminocephalosporanic acid. Included are the monobasic salts when R' is amino and the dibasic salts when R' is hyroxy. The cations comprise in these salts and embraced by M include, for example, the non-toxic metal cations such as the sodium ion, potassium ion, calcium ion, magnesium ion as well as the organic amine cations, such as the tri(lower alkyl)amine cations (e.g. triethylamine), procaine, and the like.

The novel compounds of the present invention, when A is acetoxy in Formulae I and II above, may be readily prepared by acylating 7-aminocephalosporanic acid with a compound which may be represented by the following general formulae;

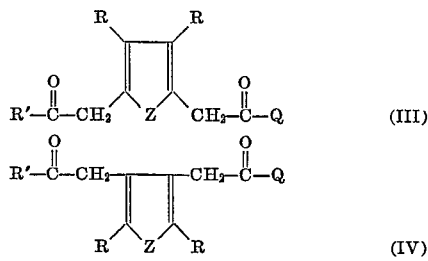

wherein R, Z and R' are as hereinbefore defined, and Q is a halide (preferably chloride), azide, acycloxy or p-nitrophenoxy group. This acylation of the 7-aminocephalosporanic acid is performed, for example, by the Schotten-Baumann method, taking into consideration the sensitivity of these compounds, under mild conditions and avantageously in the presence of a diluent or solvent such as water or an organic solvent, for example, a ketone such as acetone, an ether such as tetrahydrofuran, or a halogenated hydrocarbon such as chloroform or methylene chloride. The reaction is preferably conducted in the presence of a basic agent such as sodium bicarbonate or potassium bicarbonate, or an organic base such as one of the organic bases listed hereinbefore. The reaction is also preferably carried out at a temperature of from about 0° C. to about 25° C., preferably at 0° C.–5° C., and over a period of time of a few hours or more. Where R' is hydroxy, the diacid halide, azide or ester is condensed with 7-aminocephalosporanic acid under conditions to give monoacylation and then hydrolyzed during the work-up to give the desired product.

The acylating agents corresponding to the Formulae III and IV, when new, may be prepared by methods well-known in the art from the corresponding acids (Q is hydroxy). Thus, the acid can be treated with thionyl chloride or oxalyl chloride, if desired in the presence of dimethylformamide, to yield the corresponding acyl chlorides (Q is chlorine), which, if desired, can be converted to the acyl azides (Q is N$_3$) by treatment with sodium azide. The p-nitrophenyl esters (Q is p-nitrophenoxy)

can be prepared by following the procedure of Bodanszky et al. (Biochemical Preparations, vol. 9, p. 110, 1962, John Wiley and Sons, New York, N.Y.). Specific acylating agents (when R' is amino) operable in this process include, for example, 5-(carboxamidomethyl)thiophene-2-acetyl chloride,
2,5-dimethyl-4-(carboxamidomethyl)thiophene-3-acetyl bromide,
p-nitrophenyl 5-(carboxamidomethyl)furan-2-acetate,
3,4-dimethyl-5-(carboxamidomethyl)thiophene-2-acetyl azide,
and the like.

Specific acylating agents (when R' is hydroxy) operable in this process include, for example, 5-(carboxymethyl)thiophene-2-acetic acid diacid chloride,
2,5-dimethyl-4-(carboxymethyl)thiophene-3-acetic acid diacid bromide,
5-(carboxymethyl)furan-2-acetic acid diazide,
3,4-dimethyl-5-(carboxymethyl)thiophene-2-acetic acid di-p-nitrophenyl ester,
and the like.

The novel compounds of the present invention, when A is N-pyridinium in formulae I and II above, may be readily prepared from the corresponding 7-aminocephalosporanic acid derivatives (A is acetoxy in Formulae I and II above) by treatment with pyridine in water or aqueous acetone at 20°–50° C. and for a period of time of about 1–3 days. The resulting 3-(1-pyridylmethyl)-3-cephem-4-carboxylic acid betaines may then be isolated by standard procedures of precipitation and crystallization.

Depending on the reaction conditions used, the new compounds of the present invention are obtained in the free form or in the form of their salts. From the salts it is possible to prepare the acids in known manner, or from the acids the salts are readily accessible, for example, by reaction with hydroxides, carbonates or bicarbonates of alkali metals or alkaline earth metals, or with organic amines.

The novel compounds of the present invention are biologically active and have been found to possess antibacterial activity. As indicated, they are useful antimicrobial agents and have broad-spectrum antimicrobial activity in vitro against standard laboratory microorganisms used to screen for activity against pathogens. The antibacterial spectrum of typical compounds of the present invention, representing the concentration required to inhibit the growth of various typical bacteria, was determined in a standard manner by the agar-dilution streakplate technique which is commonly used in testing new antibiotics. The following table summarizes the in vitro activity of 7 - [5-(carboxymethyl)thiophene-2-acetylamino]cephalosporanic acid (1) and 7-[5-(carboxymethyl)thiophene-2-acetylamino] - 3 - (1-pyridylmethyl)-3-cephem-4-carboxylic acid betaine (2) as compared with Cephalosporin C (3) against a variety of disease-causing microorganisms.

| Organism | Minimal inhibitory conc. (mcg./ml.) | | |
|---|---|---|---|
| | (1) | (2) | (3) |
| Staphylococcus aureus No. 11 | 1.56 | 6.25 | 100 |
| Staphylococcus aureus ATCC 13709 | 0.78 | 1.56 | 50 |
| Streptococcus pyogenes C-203 | 0.39 | 0.78 | 25 |
| Bacillus cereus ATCC 10702 | 0.78 | 1.56 | 100 |
| Salmonella syphosa ATCC 6539 | 0.39 | 3.12 | 12.5 |
| Proteus mirabilis ATCC 9921 | 3.12 | 6.25 | 25 |
| Escherichia coli ATCC 9637 | 50 | 50 | 50 |
| Klebsiella pneumoniae KAD | 0.78 | 3.12 | 25 |
| Shigella shiga | 0.78 | 6.25 | 25 |
| Aerobacter aerogenes | 12.5 | 50 | >100 |

The compounds of the present invention retained antibacterial activity after exposure to cephalosporinase, a bacterial enzyme, which completely destroyed the activity of Cephalosporin C under the same conditions.

The high in vitro antibacterial activity of the novel compounds of the present invention makes them useful as additives to materials which are subject to microbial deterioration such as cutting oils and fuel oils. They are also useful in soaps, shampoos and topical compositions for the treatment of wounds and burns.

The invention will be described in greater detail in conjunction with the following specific examples.

Example 1.—Preparation of 7-[5-(carboxymethyl)thiophene-2-acetylamino]cephalosporanic acid Thiophene-2,5-diacetic acid (400 mg., 2 mmole) was converted to its diacid chloride with oxalyl chloride. The diacid chloride in acetone (20 ml.) was added to a stirred solution of 7-aminocephalosporanic acid (454 mg., 2 mmole) and sodium bicarbonate (672 mg., 8 mmole) in water (40 ml.) and acetone (20 ml.) which was kept between 0° C. and 5° C. The reaction was stirred for 2 hours at this temperature, and then the acetone was removed under reduced pressure. The aqueous solution was acidified to pH 1 with hydrochloric acid and the mixture extracted with ethyl acetate (3×50 ml.). The ethyl acetate solution was washed with water (100 ml.) and dried over magnesium sulfate. Evaporation of the solvent under reduced pressure gave 7-[5-(carboxymethyl)thiophene-2-acetylamino]cephalosporanic acid. The sodium salt was obtained by slurrying this product in water (10 ml.) and adding 2 N sodium hydroxide dropwise to pH 5 to effect solution. The solution was concentrated to small volume in a rotary evaporator at <50° C., and the sodium salt was precipitated by the addition of acetone. The precipitate was collected by filtration and dried to give 561 mg. of the disodium salt of 7-[5-(carboxymethyl)thiophene-2-acetylamino]cephalosporanic acid.

Example 2.—Preparation of 7-[2,5-dimethyl-4-(carboxymethyl)-thiophene-3-acetylamino]cephalosporanic acid By replacing the thiophene-2,5-diacetic acid employed in Example 1 with an equimolecular quantity of 2,5-dimethylthiophene-3,4-diacetic acid and following substantially the same procedure described in Example 1, there is obtained the 7-[2,5-dimethyl-4-(carboxymethyl)thiophene-3-acetylamino]cephalosporanic acid.

Example 3.—Preparation of 7-[5-(carboxymethyl)furan-2-acetylamino]cephalosporanic acid The procedure of Example 1 is repeated, substituting an equimolar amount of 5-(carboxymethyl)furan-2-acetic acid for the 5-(carboxymethyl)thiophene-2-acetic acid employed in that example. There is thus obtained the 7-[5 - (carboxymethyl)furan - 2 - acetylamino]cephalosporanic acid.

Example 4.—Preparation of 7-[5-(carboxamidomethyl)thiophene-2-acetylamino]cephalosporanic acid In place of the 5-(carboxymethyl)thiophene-2-acetic acid of Example 1, there is employed an equimolecular quantity of 5 - (carboxamidomethyl)thiophene - 2 - acetic acid whereby the 7-[5-(carboxamidomethyl)thiophene-2-acetylamino]cephalosporanic acid is obtained in equally good yield.

Example 5.—Preparation of 7-[5-(carboxymethyl)thiophene-2-acetylamino]-3-(1 - pyridylmethyl)-3-cephem-4-carboxylic acid betaine A solution of 7-[5-(carboxymethyl)thiophene-2-acetylamino]cephalosporanic acid (454 mg.) in pyridine (5 ml.) and water (25 ml.) was adjusted to pH 6 with acetic acid, and stored under nitrogen for 3 days at 37° C. The solution was evaporated to dryness and the residue was triturated with acetone to give the product.

Example 6.—Preparation of 7-[5-(carboxamidomethyl) thiophene - 2 - acetylamino] - 3 - (1-pyridylmethyl)-3-cephem-4-carboxylic acid betaine By the procedure described in Example 5, treatment of 7 - [5-(carboxamidomethyl)thiophene - 2 - acetylamino] cephalosporanic acid with pyridine gives 7-[5-(carboxamidomethyl)thiophene - 2 - acetylamino]-3-(1 - pyridylmethyl)-3-cephem-4-carboxylic acid betaine.

What is claimed is:

1. A compound selected from the group consisting of those of the formulae:

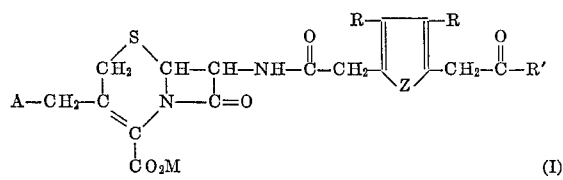

(I)

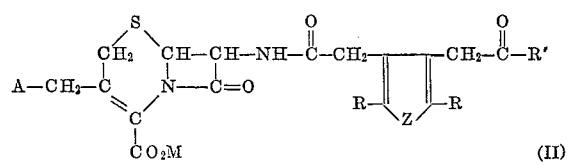

(II)

wherein R is selected from the group consisting of hydrogen and lower alkyl, Z is selected from the group consisting of oxygen and sulfur, R' is selected from the group consisting of hydroxy and amino, A is selected from the group consisting of acetoxy and N-pyridinium, and M is selected from the group consisting of hydrogen, pharmaceutically acceptable non-toxic cations and an anionic charge when A is N-pyridinium; and the non-toxic pharmaceutically acceptable basic salts thereof when R' is hydroxy.

2. A compound according to claim 1, Formula I, wherein R is hydrogen, Z is sulfur, R' is hydroxy, A is acetoxy and M is hydrogen.

3. A compound according to claim 1 Formula I, wherein R is hydrogen, Z is sulfur, R' is hydroxy, A is N-pyridinium and M is an anionic charge.

4. A compound according to claim 1, Formula II, wherein R is methyl, Z is sulfur, R' is hydroxy, A is acetoxy and M is hydrogen.

5. A compound according to claim 1, Formula I, wherein R is hydrogen, Z is sulfur, R' is amino, A is acetoxy and M is hydrogen.

6. A compound according to claim 1, Formula I, wherein R is hydrogen, Z is sulfur, R' is amino, A is N-pyridinium and M is an anionic charge.

7. A compound according to claim 1, Formula I, wherein R is hydrogen, Z is oxygen, R' is amino, A is acetoxy and M is hydrogen.

8. A compound according to claim 1, Formula I, wherein R is hydrogen, Z is oxygen, R' is hydroxy, A is N-pyridinium and M is an anionic charge.

9. A compound according to claim 1, Formula II, wherein R is methyl, Z is oxygen, R' is hydroxy, A is acetoxy and M is hydrogen.

10. A compound according to claim 1, Formula II, wherein R is methyl, Z is oxygen, R' is hydroxy, A is N-pyridinium and M is an anionic charge.

References Cited

UNITED STATES PATENTS 3,218,318  11/1965  Flynn.

FOREIGN PATENTS 968,972  6/1966  France.

NICHOLAS S. RIZZO, Primary Examiner

U.S. Cl. X.R.

252—106, 107; 260—999